(12) United States Patent
Louison et al.

(10) Patent No.: US 12,172,116 B2
(45) Date of Patent: Dec. 24, 2024

(54) AIR FILTER ASSEMBLY WITH A PERMEABLE BAFFLE

(71) Applicant: Cummins Filtration IP, Inc., Columbus, IN (US)

(72) Inventors: Matthew Louison, McFarland, WI (US); Scott Schwartz, Cottage Grove, WI (US)

(73) Assignee: Cummins Filtration IP, Inc., Columbus, IN (US)

( * ) Notice: Subject to any disclaimer, the term of this patent is extended or adjusted under 35 U.S.C. 154(b) by 765 days.

(21) Appl. No.: 17/286,910

(22) PCT Filed: Oct. 15, 2019

(86) PCT No.: PCT/US2019/056181
§ 371 (c)(1),
(2) Date: Apr. 20, 2021

(87) PCT Pub. No.: WO2020/086322
PCT Pub. Date: Apr. 30, 2020

(65) Prior Publication Data
US 2021/0354069 A1    Nov. 18, 2021

Related U.S. Application Data

(60) Provisional application No. 62/749,477, filed on Oct. 23, 2018.

(51) Int. Cl.
*B01D 46/00* (2022.01)
*B01D 39/08* (2006.01)
(Continued)

(52) U.S. Cl.
CPC ......... *B01D 46/0043* (2013.01); *B01D 39/08* (2013.01); *B01D 39/14* (2013.01);
(Continued)

(58) Field of Classification Search
CPC .... B01D 46/00; B01D 46/0002; B01D 46/56; B01D 46/62; B01D 46/64; B01D 46/645
See application file for complete search history.

(56) References Cited

U.S. PATENT DOCUMENTS 2,856,075 A    10/1958  Kahl
3,078,650 A    2/1963   Anderson et al.
(Continued)

FOREIGN PATENT DOCUMENTS

CN    2609635 Y     4/2004
CN    101573166     11/2009
(Continued)

OTHER PUBLICATIONS

International Search Report and Written Opinion issued for PCT Application No. PCT/US2019/056181, issued Dec. 23, 2019, 11 pages.

(Continued)

*Primary Examiner* — Robert A Hopkins
(74) *Attorney, Agent, or Firm* — Foley & Lardner LLP

(57) ABSTRACT

An air filter assembly comprises a housing, a filter element and a permeable baffle. The housing comprises an outer wall with a substantially cylindrical inner surface, an inlet, and an outlet. The inlet is positioned along and extends through the outer wall. The outlet is positioned along and extends through an axial end of the housing. The filter element comprises a filter media with a substantially cylindrical outer surface. The filter element is positionable within the housing. The permeable baffle is positioned between the inlet and the filter element. The permeable baffle allows at least some air to flow therethrough.

36 Claims, 6 Drawing Sheets

(51) Int. Cl.
  *B01D 39/14* (2006.01)
  *B01D 46/24* (2006.01)
  *B01D 46/62* (2022.01)
  *B01D 46/64* (2022.01)

(52) U.S. Cl.
  CPC ..... *B01D 46/0004* (2013.01); *B01D 46/0005* (2013.01); *B01D 46/0046* (2013.01); *B01D 46/2411* (2013.01); *B01D 46/62* (2022.01); *B01D 46/64* (2022.01); *B01D 46/645* (2022.01); *B01D 2239/0613* (2013.01); *B01D 2239/0618* (2013.01); *B01D 2239/1258* (2013.01); *B01D 2239/1291* (2013.01)

(56) References Cited

U.S. PATENT DOCUMENTS

| | | | |
|---|---|---|---|
| 3,423,909 A * | 1/1969 | Bennett | B01D 46/10 55/498 |
| 3,659,402 A | 5/1972 | Alliger | |
| 3,745,753 A | 7/1973 | Risse | |
| 3,920,553 A | 11/1975 | Cilento | |
| 3,928,007 A | 12/1975 | Jackson | |
| 4,020,783 A | 5/1977 | Anderson et al. | |
| 4,243,397 A | 1/1981 | Tokar et al. | |
| 4,477,270 A | 10/1984 | Tauch | |
| 4,619,764 A | 10/1986 | Church et al. | |
| 4,906,365 A | 3/1990 | Baumann et al. | |
| 5,098,559 A | 3/1992 | Mack et al. | |
| 5,252,207 A | 10/1993 | Miller et al. | |
| 5,258,127 A | 11/1993 | Gsell et al. | |
| 5,468,386 A | 11/1995 | Ardes | |
| 5,520,801 A | 5/1996 | Gerber et al. | |
| 5,718,825 A | 2/1998 | Greive et al. | |
| 5,882,367 A | 3/1999 | Morgan et al. | |
| 5,888,384 A | 3/1999 | Wiederhold et al. | |
| 5,902,479 A | 5/1999 | Fukumori et al. | |
| 6,015,492 A | 1/2000 | Popoff et al. | |
| 6,068,762 A | 5/2000 | Stone et al. | |
| 6,099,729 A | 8/2000 | Cella et al. | |
| 6,146,433 A | 11/2000 | Bitner | |
| 6,258,143 B1 | 7/2001 | Carawan et al. | |
| 6,280,493 B1 | 8/2001 | Eubank | |
| 6,308,836 B1 | 10/2001 | Guichaoua et al. | |
| 6,402,798 B1 | 6/2002 | Kallsen et al. | |
| 6,506,303 B1 | 1/2003 | Gustafsson et al. | |
| 6,543,625 B1 | 4/2003 | Le Roux et al. | |
| 6,565,746 B1 | 5/2003 | Stamey et al. | |
| 6,585,889 B2 | 7/2003 | Weingaertner | |
| 6,626,715 B1 | 9/2003 | Noble | |
| 6,706,181 B1 | 3/2004 | Baumann et al. | |
| 6,709,576 B2 | 3/2004 | Jokschas | |
| 6,833,066 B2 | 12/2004 | Baumann et al. | |
| 6,835,305 B1 | 12/2004 | Baumann et al. | |
| 6,902,598 B2 | 6/2005 | Gunderson et al. | |
| 6,910,692 B2 | 6/2005 | Malone et al. | |
| 6,936,169 B2 | 8/2005 | Baumann et al. | |
| 6,958,083 B1 | 10/2005 | Schmitz et al. | |
| 6,972,092 B1 | 12/2005 | Roll | |
| 6,991,665 B1 | 1/2006 | Allen et al. | |
| 7,001,440 B1 | 2/2006 | Chilton | |
| 7,060,184 B2 | 6/2006 | Cline et al. | |
| 7,115,150 B2 | 10/2006 | Johnson et al. | |
| 7,297,255 B2 | 11/2007 | Stockbower | |
| 7,390,407 B2 | 6/2008 | Weindorf et al. | |
| 7,524,349 B2 | 4/2009 | Schrage et al. | |
| 7,537,631 B2 | 5/2009 | Scott et al. | |
| 7,572,306 B2 | 8/2009 | Hawkins et al. | |
| 7,585,345 B2 | 9/2009 | Smasal et al. | |
| 7,740,678 B2 | 6/2010 | Gunderson et al. | |
| 7,833,305 B1 | 11/2010 | Studer | |
| 7,871,517 B2 | 1/2011 | Komine et al. | |
| 7,887,701 B2 | 2/2011 | Schmid et al. | |
| 7,998,251 B2 | 8/2011 | Pondelick et al. | |
| 8,099,999 B2 | 1/2012 | Nakano | |
| 8,168,066 B2 | 5/2012 | Wieczorek et al. | |
| 8,375,925 B2 | 2/2013 | Ichikawa et al. | |
| 8,431,021 B2 | 4/2013 | Mccague | |
| 8,726,876 B2 | 5/2014 | Kobayashi et al. | |
| 8,784,523 B2 | 7/2014 | Coulonvaux et al. | |
| 8,821,734 B2 | 9/2014 | Grass et al. | |
| 8,828,114 B2 | 9/2014 | Dhiman et al. | |
| 8,845,897 B2 | 9/2014 | Wieczorek et al. | |
| 9,457,308 B2 | 10/2016 | Kaufmann et al. | |
| 9,562,449 B2 | 2/2017 | Gao et al. | |
| 9,718,010 B2 | 8/2017 | Byun et al. | |
| 2002/0100720 A1 | 8/2002 | Jainek | |
| 2002/0108897 A1 | 8/2002 | Pavlin et al. | |
| 2002/0170856 A1 | 11/2002 | Jaroszczyk et al. | |
| 2003/0127384 A1 | 7/2003 | Kapur | |
| 2004/0093859 A1 | 5/2004 | Schmeichel et al. | |
| 2004/0139572 A1 | 7/2004 | Kisela et al. | |
| 2004/0206682 A1 | 10/2004 | Hamlin et al. | |
| 2005/0193695 A1 | 9/2005 | Holmes et al. | |
| 2005/0279958 A1 | 12/2005 | Baumann | |
| 2006/0060085 A1 * | 3/2006 | Ptak | B01D 39/1623 55/486 |
| 2006/0118475 A1 | 6/2006 | Girondi | |
| 2006/0118476 A1 | 6/2006 | Weindorf et al. | |
| 2006/0207948 A1 | 9/2006 | Hacker et al. | |
| 2007/0215561 A1 | 9/2007 | Yates et al. | |
| 2008/0190082 A1 | 8/2008 | Scott et al. | |
| 2008/0289305 A1 | 11/2008 | Girondi | |
| 2010/0122952 A1 | 5/2010 | South et al. | |
| 2010/0146917 A1 | 6/2010 | Coulonvaux et al. | |
| 2011/0308212 A1 | 12/2011 | Ruhland et al. | |
| 2011/0315126 A1 | 12/2011 | Yoshida et al. | |
| 2012/0067014 A1 | 3/2012 | Dhiman et al. | |
| 2013/0025557 A1 | 1/2013 | Chlystek et al. | |
| 2013/0043176 A1 | 2/2013 | Johnson et al. | |
| 2013/0213235 A1 | 8/2013 | Da Silva et al. | |
| 2014/0373714 A1 | 12/2014 | Cloud et al. | |
| 2016/0177890 A1 | 6/2016 | Kobayashi et al. | |
| 2017/0028324 A1 | 2/2017 | Komiyama et al. | |
| 2017/0368487 A1 | 12/2017 | Bannister et al. | |
| 2019/0217237 A1 | 7/2019 | Cloud et al. | |

FOREIGN PATENT DOCUMENTS

| | | | |
|---|---|---|---|
| CN | 102958581 A | 3/2013 | |
| CN | 103025405 A | 4/2013 | |
| CN | 104411385 | 3/2015 | |
| CN | 104421062 A | 3/2015 | |
| CN | 105008014 | 10/2015 | |
| CN | 105308238 | 2/2016 | |
| CN | 106139750 | 11/2016 | |
| CN | 107019970 | 8/2017 | |
| CN | 108079675 A * | 5/2018 | |
| CN | 108087162 | 5/2018 | |
| DE | 23 08 840 A1 | 8/1973 | |
| DE | 35 38 589 A1 | 5/1987 | |
| DE | 19646350 C2 | 7/2000 | |
| DE | 19524417 C2 | 4/2001 | |
| DE | 10064482 A1 | 7/2002 | |
| DE | 44 44 934 B4 | 5/2004 | |
| DE | 69726690 T2 | 10/2004 | |
| DE | 19650185 B4 | 11/2007 | |
| DE | 60317288 T2 | 8/2008 | |
| EP | 0 781 586 A2 | 12/1996 | |
| EP | 0 887 098 A2 | 12/1998 | |
| EP | 1 256 707 A2 | 11/2002 | |
| EP | 1 616 611 A1 | 1/2006 | |
| EP | 1 974 786 A1 | 10/2008 | |
| EP | 2 263 772 A1 | 12/2010 | |
| EP | 2 336 510 A1 | 6/2011 | |
| EP | 2 337 618 A1 | 6/2011 | |
| EP | 2 722 091 A1 | 4/2014 | |
| EP | 3 034 823 A1 | 6/2016 | |
| JP | 09-010515 A | 1/1997 | |
| JP | 2004-167295 A | 6/2004 | |
| KR | 1020050032337 A | 4/2005 | |
| KR | 1020060069636 A | 6/2006 | |
| WO | WO-02/20132 A2 | 3/2002 | |
| WO | WO-2004/069373 A1 | 8/2004 | |

(56) References Cited

FOREIGN PATENT DOCUMENTS

| WO | WO-2007/043669 A1 | 4/2007 |
| WO | WO-2015/027183 | 2/2015 |
| WO | WO-2017/108483 A1 | 6/2017 |

OTHER PUBLICATIONS

Second Office Action issued for Chinese Patent Application No. CN 201980068962.1 issued Jun. 2, 2022, 9 pages.
First Chinese Office Action issued for Chinese Paten Application No. CN 201980068962.1 issued Jan. 12, 2022, 11 pages.
First Examination Report for Indian Patent Application No. 865/DELNP/2009 dated Jun. 12, 2017, 8 pages.
First Office Action issued for Chinese Patent Application No. 200880020548.5 dated Jan. 31, 2012, 5 pages (with English translation).
First Office Action issued for Chinese Patent Application No. 201580067749.0 dated Aug. 28, 2018, 14 pages (with English translation).
International Search Report and Written Opinion for PCT/US2008/067328, dated Dec. 30, 2008, 8 pages.
International Search Report and Written Opinion for PCT/US2015/066579 dated Feb. 26, 2016, 12 pages.
Notice of Allowance issued for U.S. Appl. No. 16/006,078 issued Apr. 3, 2020, 20 pages.
Office Action for German Patent Application No. 112007001880.1 dated Feb. 6, 2018, 23 pages (with English translation).
Office Action for German Patent Application No. 112008001571.6 dated Mar. 1, 2016, 12 pages (with English translation).

* cited by examiner

AIR FILTER ASSEMBLY WITH A PERMEABLE BAFFLE

CROSS-REFERENCE TO RELATED PATENT APPLICATIONS

This application is a National Phase of PCT Application No. PCT/US2019/056181, filed Oct. 15, 2019, claims priority to and the benefit of U.S. Provisional Patent Application No. 62/749,477, filed on Oct. 23, 2018. The contents of these applications are hereby incorporated by reference in their entirety.

FIELD

The present invention relates generally to baffles for air filter assemblies.

BACKGROUND

A conventional tangential-inlet, cylindrical air filter assembly 120 is shown in FIGS. 1A-1C, which includes a housing 130 and a cover 122. The housing 130 includes an inlet 132 and an outlet 134 and houses a filter element 140. The housing 130 is substantially cylindrical and therefore includes a cylindrical outer wall 136 that extends completely around the circumference of the filter element 140. The filter element 140 is positioned relatively centrally within the housing 130 and includes a filter media 142 for filtering the air. The cover 122 may include a dust evacuator port 124.

Conventional tangential-inlet, cylindrical air filter assemblies 120 are widely used in heavy dust environments to provide two-stage filtration. The first stage is a precleaning operation through inertial particle separation. The second stage is filtration through the filter media 142 of the filter element 140. In order to clean the air (as shown in FIG. 1C), the dirty air enters into the housing 130 through the inlet 132 in a direction tangential to the cylindrical inner surface of the outer wall 136 of the housing 130. The air then continues to flow in a tangential direction (as shown with the tangential flow path 128) between the outer wall 136 and the filter media 142 (i.e., along the inner surface of the outer wall 136 of the housing 130 and around the outside of the filter media 142 of the filter element 140). This tangential air flow effectively creates a spinning vortex within the housing 130, which pushes solid particles contained within the air flow toward the inner surface of the outer wall 136 through radial or centrifugal forces.

The solid particles (e.g., dust) that are separated from the air flow and are near the inner surface of the outer wall 136 can then be separated and removed from the housing 130 and the cover 122 through the dust evacuator port 124. Accordingly, the air that will subsequently flow through the filter media 142 is relatively cleaner, which prolongs the life of the filter media 142 since the filter media 142 collects less solid particles in a certain volume of air and thus the filter element 140 can filter a greater volume of air before reaching its terminal restriction.

Precleaning efficiency refers to the percentage of total solid particle mass that is removed or captured in the first stage of the conventional air filter assembly 120, prior to the air flowing into the filter element 140. In order to improve or aid in the precleaning efficiency, the conventional air filter assembly 120 includes a solid, cylindrical rib, or baffle 150 that extends around a portion of the outside of the filter element 140 near the inlet 132. The impermeable baffle 150 is configured to prevent any air flow from moving therethrough and into the filter element 140. The impermeable baffle 150 may be molded into the housing 130 or the cover 122 or wrapped around the filter element 140.

The impermeable baffle 150 ensures that most of the solid particles in the air (flowing directly from the inlet 132) are initially blocked from impacting the filter media 142 and thereby prevented entering into the filter media 142. Instead, these solid particles are diverted away from the filter media 142 of the filter element 140, which increases the likelihood that the solid particles will deflect to the inner surface of the outer wall 136, rather than into the filter media 142.

While the impermeable baffle 150 aids in deflecting solid particles away from the filter media 142, the impermeable baffle 150 increases the restriction or pressure loss of the conventional air filter assembly 120. Since the terminal restriction is typically fixed, the conventional air filter assembly 120 will be operated until a particular terminal restriction value is reached (i.e., operators are instructed to change the filter element 140 at 25 inches of water ($inH_2O$) restriction). Accordingly, by increasing the restriction, the impermeable baffle 150 effectively reduces the allowable pressure increase or restriction gain within the conventional air filter assembly 120.

SUMMARY

Various embodiments provide for an air filter assembly that comprises a housing, a filter element and a permeable baffle. The housing comprises an outer wall with a substantially cylindrical inner surface, an inlet, and an outlet. The inlet is positioned along and extends through the outer wall. The outlet is positioned along and extends through an axial end of the housing. The filter element comprises a filter media with a substantially cylindrical outer surface. The filter element is positionable within the housing. The permeable baffle is positioned between the inlet and the filter element. The permeable baffle allows at least some air to flow therethrough.

Various other embodiments provide for an air filter assembly that comprises a housing and a permeable baffle. The housing comprises an outer wall, an inlet, and an outlet. The housing contains a filter element. The outer wall comprises a substantially cylindrical inner surface that incoming air flow from the inlet flows substantially tangential to. The outlet is positioned along and extends through an axial end of the housing. The permeable baffle is positioned within the housing between the inlet and the filter element and shields at least a portion of the filter element from the incoming air flow through the inlet.

Various other embodiments provide for an air filter assembly that comprises a housing, a cover, and a permeable baffle. The housing comprises an outer wall, an inlet, and an outlet. The housing contains a filter element. The outer wall comprises a substantially cylindrical inner surface that incoming air flow from the inlet flows substantially tangential to. The housing comprises a first axial end and a second axial end. The outlet is positioned along and extends through the first axial end of the housing. The second axial end of the housing is substantially open. The cover is attachable to the second axial end of the housing such that the cover covers the second axial end. The permeable baffle is positioned within the cover in order to be positioned between the inlet and the filter element and to shield at least a portion of the filter element from the incoming air flow through the inlet.

Various other embodiments provide for an air filter element that comprises a filter media for filtering air and a permeable baffle. The permeable baffle is directly or indirectly attachable to the filter media and shields at least a portion of the filter media.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, various embodiments disclosed herein relate to an air filter assembly that includes a permeable baffle. Compared to various conventional impermeable baffles (such as the impermeable baffle 150, as described further herein), the permeable baffle has similar inertial precleaning performance, but does not increase or add to the restriction of the air filter assembly nearly as much as the conventional impermeable baffle. Accordingly, the permeable baffle increases the system capacity of the air filter assembly and prolongs the life of the filter element. The system capacity refers to the total dust mass that is removed during the precleaning operation in the first stage and captured by the filter element in the second stage at the terminal pressure drop.

Air Filter Assembly

Figure 1A:
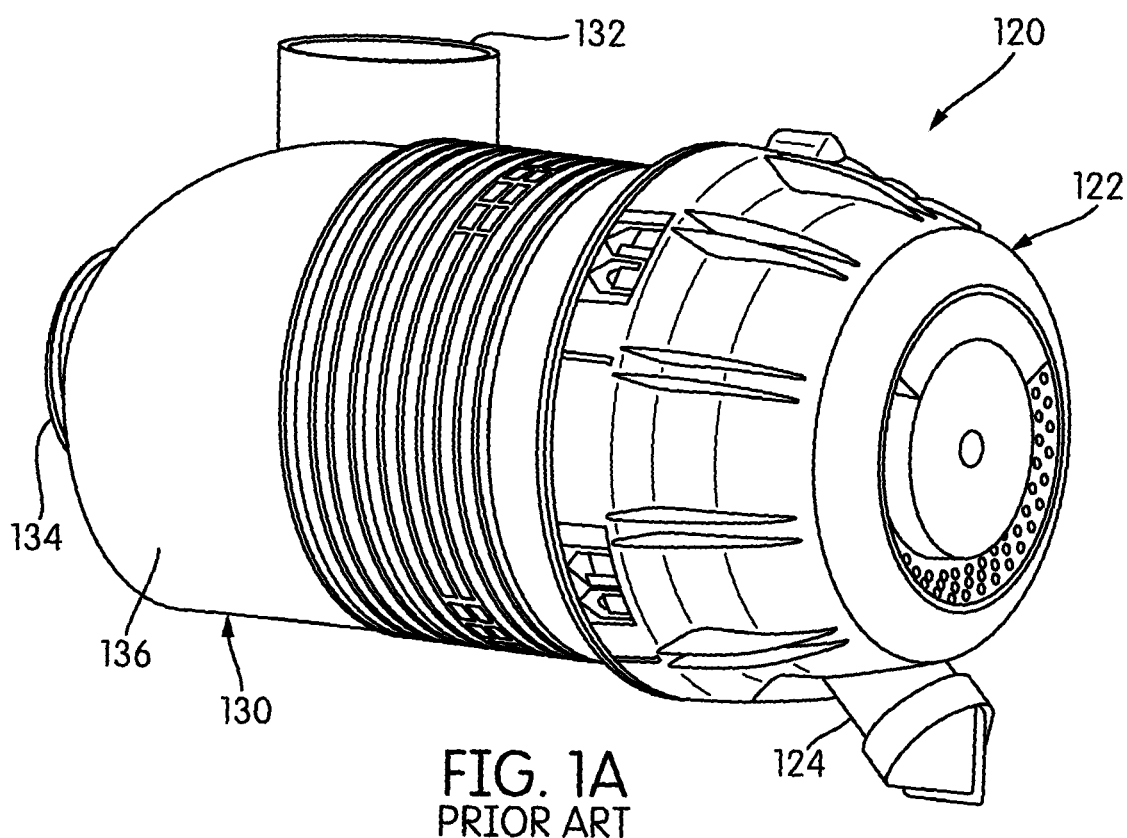
FIG. 1A is a perspective view of a conventional air filter assembly.
Figure 1B:
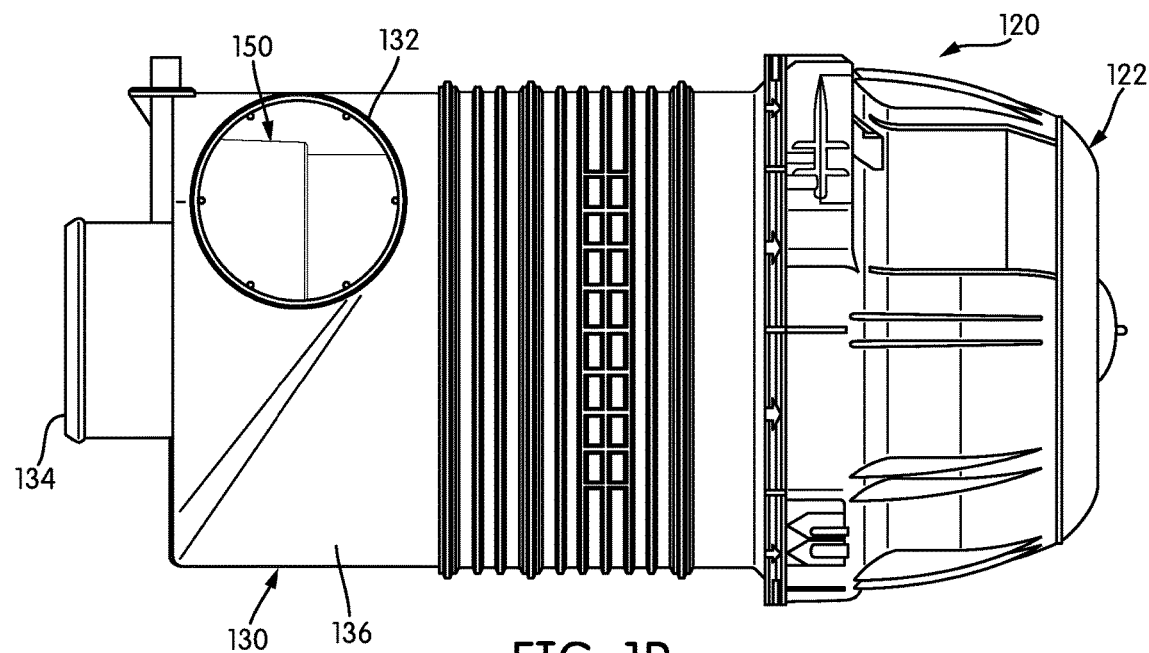
FIG. 1B is a top view of the conventional air filter assembly of FIG. 1A.
Figure 1C:
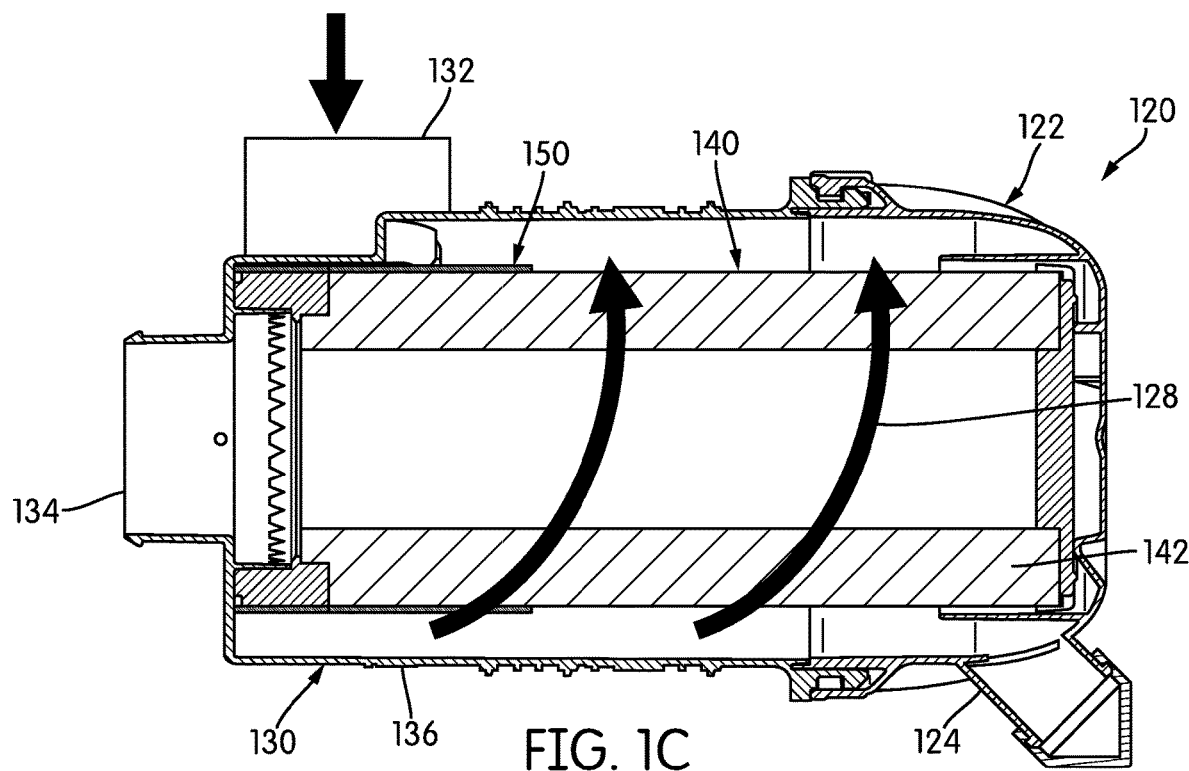
FIG. 1C is a cross-sectional view of the conventional air filter assembly of FIG. 1A.
Figure 2A:
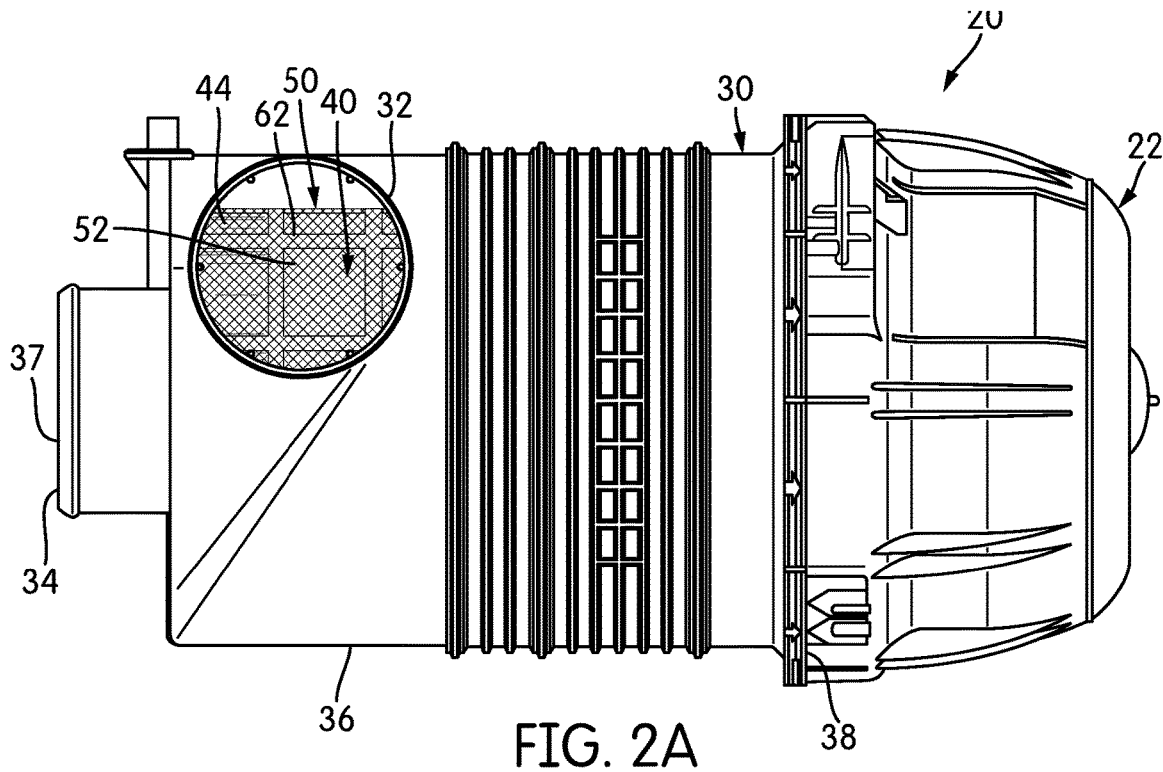
FIG. 2A is a top view of an air filter assembly according to one embodiment.
Figure 2B:
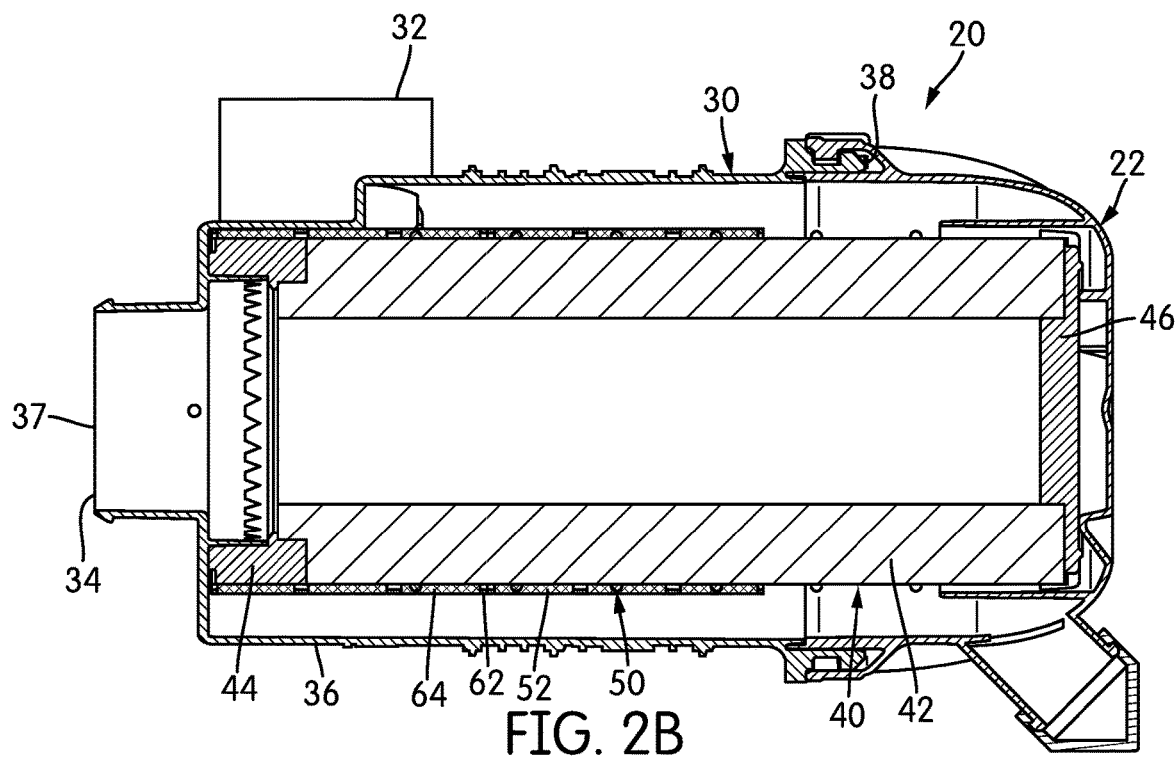
FIG. 2B is cross-sectional view of the air filter assembly of FIG. 2A.

FIGS. 2A-2B show a two-stage, substantially cylindrical air cleaner or filter assembly 20 that includes a housing 30, a cover 22, and a substantially cylindrical air filter element 40. The housing 30 and the cover 22 are configured to contain or house the filter element 40.

The housing 30 is substantially cylindrical and comprises a substantially cylindrical outer wall 36, an inlet 32, and an outlet 34. The outer wall 36 includes a substantially cylindrical inner surface (according to various embodiments, the outer surface of the outer wall 36 may be a variety of different shapes) and extends completely around the filter element 40 once the air filter assembly 20 is assembled. The housing 30 (in particular the outer wall 36) extends axially between and comprises a first axial end 37 and a second axial end 38. The outlet 34 is positioned along the first axial end 37 and the second axial end 38 is substantially open. The filter element 40 may extend through the second axial end 38, as shown in FIG. 2B. Once the filter element 40 is positioned within the housing 30, the second axial end 38 may be attached to and closed off by the cover 22 (and/or an end of the filter element 40). Accordingly, the cover 22 is removably attachable (and detachable from and reattachable to) the second axial end 38 of the housing 30 such that the cover 22 (and/or an end of the filter element 40) covers the second axial end 38 when closed. Accordingly, the cover 22 and the outlet 34 are along opposite axial end or sides of the housing 30.

The filter element 40 is positionable relatively centrally within the outer wall 36 of the housing 30 and within the cover 22. The filter element 40 comprises a substantially cylindrical filter media 42, an open axial end, and a closed axial end. The open axial end is referred to herein as a first endplate or endcap 44, and the closed axial end is referred to herein as a second endplate or endcap 46, although it is understood that the filter element 40 may not have any endcaps. The filter media 42 has a substantially cylindrical or curved outer surface and is configured to filter a fluid, such as air. The outer surface of the filter media 42 is the upstream side (or unfiltered side) of the filter media 42. The inner surface of the filter media 42 is the downstream side (or filtered side) of the filter media 42. The inner surface of the filter media 42 defines an inner area of the filter media 42 through which filtered air can flow within the filter media 42 (and subsequently out through the housing 30).

The first endcap 44 and the second endcap 46 are positioned along and attached to opposite axial ends of the filter media 42 (i.e., the filter media 42 is positioned and extends axially between the first endcap 44 and the second endcap 46). The first endcap 44 is positioned within the housing 30, and the second endcap 46 is positioned at least partially within the cover 22. The first endcap 44 has a through-hole extending completely through first endcap 44 such that the filter element 40 has an open axial end within the housing 30. The first endcap 44 of the filter element 40 may be positioned along the first axial end 37 of the housing 30. In particular, the first endcap 44 is positioned circumferentially around (and/or within) the outlet 34 of the housing 30 and allows the open axial end of the filter media 42 to fluidly connect to the outlet 34. The first endcap 44 is fluidly connected to and forms an airtight seal with the outlet 34 to prevent any leakage. Accordingly, filtered air within the filter media 42 exits the filter element 40 (and the entire air filter assembly 20) through the first endcap 44 and subsequently through the outlet 34. The second endcap 46 may close off the other axial end of the filter element 40 such that the filter element 40 has a closed axial end within the cover 22. The second endcap 46 may extend outside of the housing 30 and at least partially into the cover 22. According to one embodiment as shown in FIG. 2B, the second endcap 46 is completely positioned within, enclosed by, and covered by the cover 22. According to another embodiment, the second endcap 46 at least partially extends through an aperture defined by the cover 22 and therefore is not completely positioned within, enclosed by, and covered by the cover 22.

The inlet 32 of the housing 30 is configured to direct dirty air into the air filter assembly 20 and toward the dirty side (i.e., the outer surface) of the filter media 42 of the filter element 40. The inlet 32 is positioned along and extends completely through the outer wall 36. The inlet 32 is a tangential inlet and accordingly directs the incoming dirty or unfiltered air flow (that is directly from the inlet 32) to flow at least partially or substantially tangentially to and along the inner surface of the outer wall 36 and the outer surface of the filter media 42 of the filter element 40. Furthermore, the inlet 32 may be axially offset from the centerline of the housing 30 (such that the inlet 32 is closer to one axial end (e.g., the first axial end 37) than the other axial end (e.g., the second axial end 38)) along the axial length of the outer wall 36. For example, the inlet 32 may be closer to the first axial end 37 than the second axial end 38 of the housing 30.

The outlet 34 of the housing 30 is configured to release clean air from the clean or filtered side (i.e., the inner surface) of the filter media 42 of the filter element 40 and from the entire air filter assembly 20. The outlet 34 is positioned along and extends completely through an axial end of the outer wall 36 (that corresponds to the first axial end 37 of the housing 30) such that the outlet 34 is positioned along one axial end of the filter media 42. Accordingly, the outlet 34 is fluidly connected to the inside area (i.e., the clean side) of the filter media 42 through the one axial end of the filter media 42. The outlet 34 is an axial outlet and accordingly axially draws air from within the filter media 42 and into and through the outlet 34.

The housing 30, the inlet 32, the outlet 34, the outer wall 36, the cover 22, the filter element 40, and the filter media 42 may be similar to and include the various features and components of the housing 130, the inlet 132, the outlet 134, the outer wall 136, the cover 122, the filter element 140, and the filter media 142, respectively, unless otherwise noted in the description herein.

Permeable Baffle

The air filter assembly 20 further includes a permeable wrap, shielding, or baffle 50 that improves the precleaning efficiency of the precleaning operation (i.e., the first stage, as described further herein) of the air filter assembly 20 while providing a lower pressure drop (compared to the pressure drop created by the impermeable baffle 150). The permeable baffle 50 is configured such that at least some fluid (e.g., air) is allowed to flow or move through the permeable baffle 50 and subsequently into the filter media 42, while some particles are prevented from flowing through the permeable baffle 50.

More specifically, the permeable baffle 50 ensures that some, but not all, of the air (flowing directly from the inlet 32) is initially blocked from impacting the filter media 42 and thereby is prevented entering into the filter media 42. The blocked air is diverted away from the filter media 42 of the filter element 40 (and instead moves tangentially along the inner surface of the outer wall 36 and around the outer surface of the filter media 42, between the inner surface of the outer wall 36 and the outer surface of the permeable baffle 50 and/or the outer surface of the filter media 42), which decreases the amount of solid particles that flow into the filter media 42 and increases the amount of solid particles that instead are deflected to the inner surface of the outer wall 36. However, the permeable baffle 50 allows some of the air directly from the inlet 32 to flow through the permeable baffle 50 and subsequently into the filter media 42 (unlike the impermeable baffle 150), which reduces the amount of pressure loss and restriction caused by the permeable baffle 50 (compared to the impermeable baffle 150), thereby maximizing the amount of allowable pressure increase or restriction gain within the air filter assembly 20 with a baffle.

The permeable baffle 50 is configured to be positioned and contained within the housing 30 and/or cover 22 in order to be positioned between the inlet 32 and the filter element 40 and to shield at least a portion of the filter media 42 of the filter element 40 from the incoming air flow through inlet 32. Accordingly, the permeable baffle 50 extends around and partially covers and shields at least a portion of the curved outer surface of the filter media 42 from incoming dirty air that is entering into the air filter assembly 20 through the inlet 32 at a high velocity. Accordingly, the permeable baffle 50 is positioned and extends near the inlet 32 and is positioned radially between the inlet 32 and the filter media 42 of the filter element 40 such that, when dusty or dirty air enters into the air filter assembly 20 through the inlet 32, the dirty air first encounters the permeable baffle 50 prior to reaching the filter media 42. As shown in FIGS. 3-6 and described further herein, the permeable baffle 50 may be integrated or incorporated into the air filter assembly 20 in variety of different manners.

The permeable baffle 50 may have a complementary curvature to the outer surface of the filter media 42 and therefore may be substantially or at least partially cylindrical or curved. Depending on which areas of the filter media 42 the permeable baffle 50 covers, the permeable baffle 50 may be curved into an arc (i.e., extending in a partial circle) or may be completely cylindrical (i.e., extending in a complete circle), positioned around the filter media 42. The permeable baffle 50 covers and extends axially along at least a portion of the axial length of the outer surface of the filter media 42 of the filter element 40, covering anywhere between 1% and 100% of the exposed outer portions (e.g., the dirty side) of the filter media 42. Furthermore, the permeable baffle 50 extends tangentially partially or completely around the outer circumference of the outer surface of the filter media 42 of the filter element 40. The permeable baffle 50 may cover the entire outer surface of the filter media 42 or only a portion of the outer surface of the filter media 42. Accordingly, the permeable baffle 50 may cover and extend along the entire axial length or only a portion of the axial length in the axial direction and may cover and extend along (or surround or wrap around) the entire outer circumference or only a portion of the outer circumference in the tangential direction.

The permeable baffle 50 comprises a permeable material 52 in order to allow some air flow through the permeable baffle 50, but prevent large solid particles from moving through the permeable baffle 50. For example, the permeable material 52 includes a solid portion (e.g., fibers) and through-holes or apertures (e.g., the gaps between the fibers). The solid portions of the permeable material 52 deflect the large particles away from the permeable baffle 50 in order to prevent large particles from moving through the permeable baffle 50 and toward the filter media 42. Accordingly, the permeable baffle 50 creates nearly the same precleaning efficiency increase as the impermeable baffle 150. However, since the permeable baffle 50 is permeable and does allow some air to penetrate and flow therethrough, the permeable baffle 50 reduces the amount of restriction and pressure loss within the air filter assembly 20 compared to the impermeable baffle 150. Accordingly, the permeable baffle 50 increases the allowable pressure increase or restriction gain of the air filter assembly 20 compared to the conventional air filter assembly 120 with the impermeable baffle 150, while still precleaning the incoming air prior to flowing through the filter element 40. Therefore, the permeable baffle 50 increases the system capacity of the air filter assembly 20 compared to the conventional air filter assembly 120 with the impermeable baffle 150.

Frame

Figure 3:
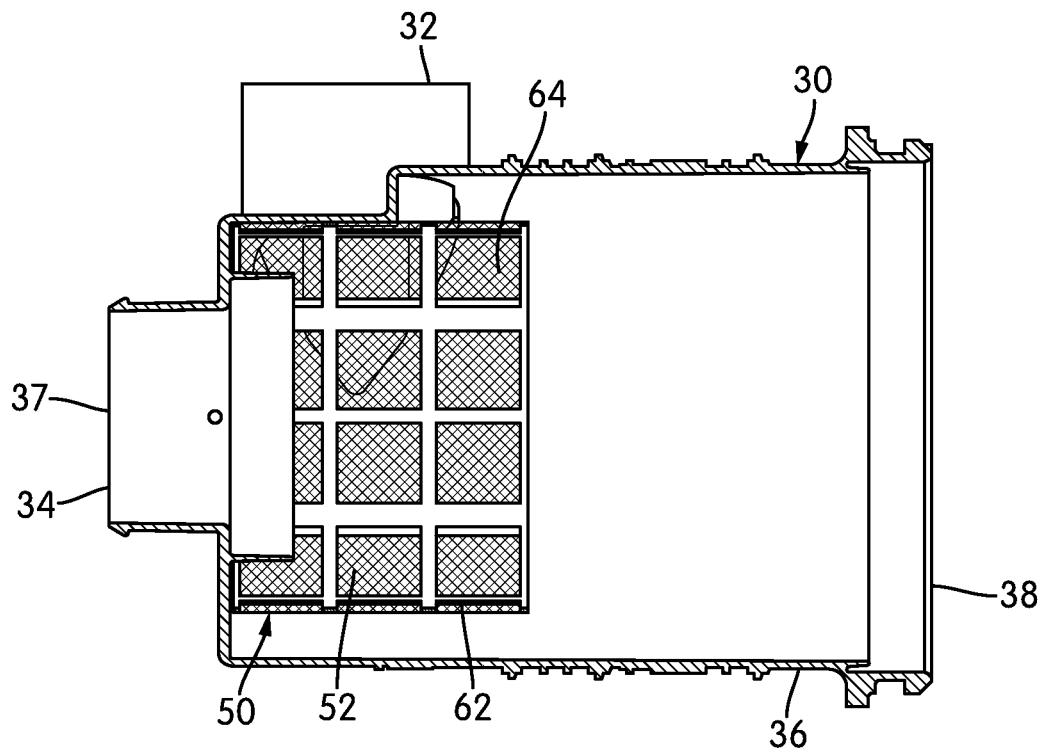
FIG. 3 is a cross-sectional view of a housing and a permeable baffle according to one embodiment.
Figure 4:
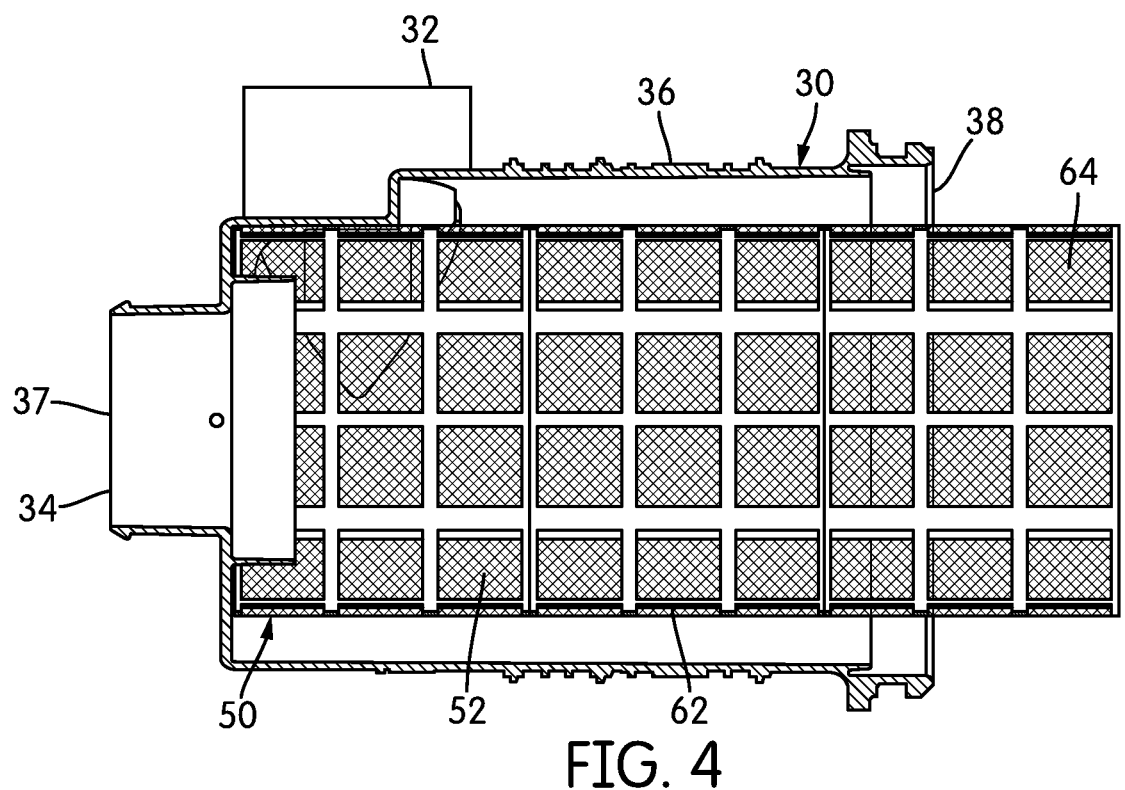
FIG. 4 is a cross-sectional view of a housing and a permeable baffle according to another embodiment.
Figure 5:
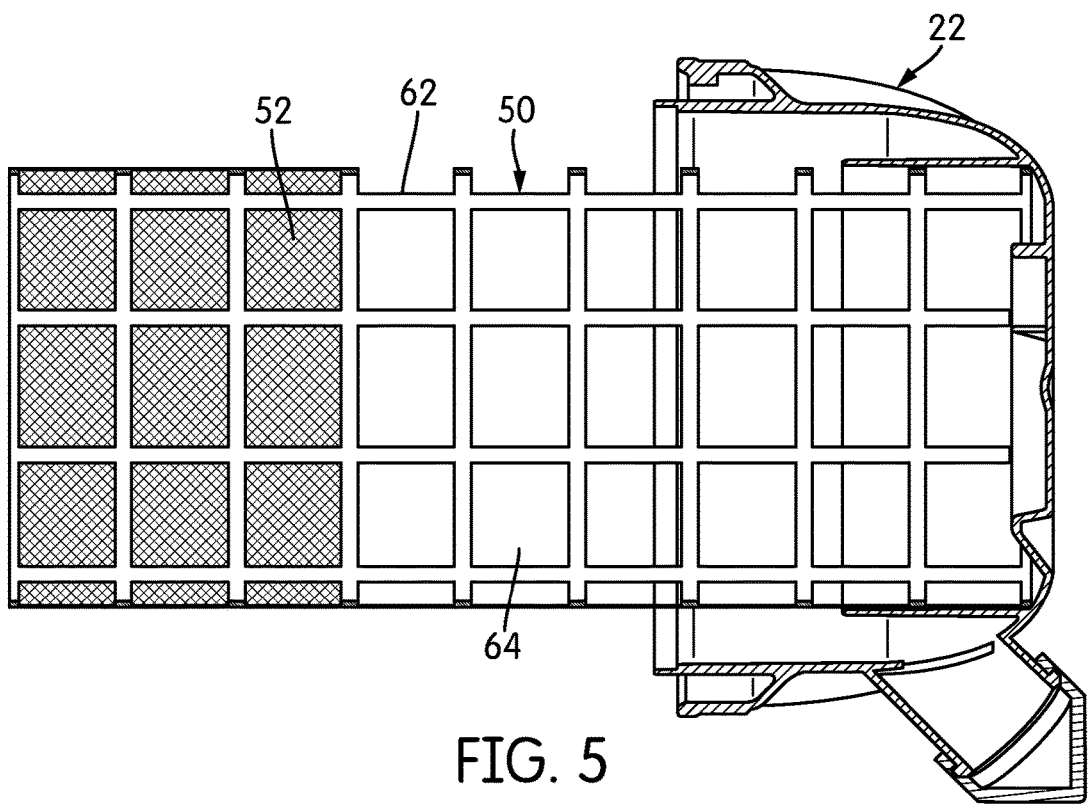
FIG. 5 is a cross-sectional view of a cover and a permeable baffle according to yet another embodiment.

According to one embodiment as shown in FIGS. 3-5, the permeable baffle 50 includes a support frame 62 that the permeable material 52 is attached to or integrated with. The frame 62 provides a structure to give shape and support to the permeable material 52 and is configured to be mounted or attached to a portion of the housing 30. The frame 62 may have openings 64 along which the permeable material 52 is attached. As shown in FIGS. 3-4, the permeable material 52 covers and extends over all of the openings 64 within the frame 62. Alternatively, as shown in FIG. 5, the permeable material 52 covers and extends over only some of the openings 64, while other openings 64 of the frame 62 are completely open to allow air to flow unrestricted therethrough (in particular in areas that are spaced apart from the inlet 32).

According to one embodiment as shown in FIGS. 3-4, the frame 62 may be attached to the housing 30. For example, the frame 62 of the permeable baffle 50 may be attached to an inner area near or along the first axial end 37 of the housing 30 and may circumferentially surround the outlet 34. The frame 62 may be radially spaced apart and outward from the outlet 34 such that the filter element 40 can be positioned radially in between the permeable baffle 50 and the outlet 34.

According to another embodiment as shown in FIG. 5, the frame 62 may be attached to the cover 22. For example, the frame 62 may be attached to one end of the inner area of the cover 22. Once the cover 22 is attached to the housing 30, the frame 62 may then circumferentially surround the outlet 34 of the housing 30.

According to one embodiment, the permeable baffle 50 (in particular the frame 62) is a permanent part of or permanently fixed to the housing 30 or cover 22 (e.g., permanently attached to, molded to, or constructed with the housing 30 or cover 22 as a single piece or unitary component that cannot be separated without destruction). According to another embodiment, the permeable baffle 50 (in particular the frame 62) is removably attachable to the housing 30 or cover 22 as a separate component (as shown in FIGS. 3-5).

In order to fit around the curved outer surface of the filter media 42, the frame 62 may have a complementary curvature to the outer surface of the filter media 42 and therefore may be substantially or at least partially cylindrical. Depending on which portions of the filter media 42 the frame 62 extends around or covers, the frame 62 may curve around only a portion of or the entire outer circumference of the filter media 42. Accordingly, the frame 62 may be curved into an arc (i.e., extending in a partial circle) or may be completely cylindrical (i.e., extending in a complete circle) with a larger inner diameter than the outer diameter of the filter media 42.

According to one embodiment, the permeable baffle 50 axially extends only along a portion of the axial length of the filter element 40, and therefore only axially extends along a portion of the inner area of the housing 30, as shown in FIG. 3. Accordingly, in this embodiment, the permeable baffle 50 does not extend to or beyond the second axial end 38 of the housing 30.

According to another embodiment, the permeable baffle 50 axially extends along the entire length of the filter element 40 and accordingly axially extends at least to, and optionally beyond and through, the second axial end 38 of the housing 30. Therefore, if the frame 62 is attached to the housing 30 (as shown in FIG. 4), the frame 62 extends along the majority of or the entire length of the inner area of the housing 30. Depending on the length of the filter element 40 (and therefore the permeable baffle 50), the permeable baffle 50 may extend beyond the end of the housing 30 in order to extend into the inner area of the cover 22 once the air filter assembly 20 is assembled. Alternatively, if the frame 62 is attached to the cover 22 (as shown in FIG. 5), the frame 62 extends along the entire length of the cover 22 and beyond the end of the cover 22 in order to also extend along the entire length of the inner area of the housing 30 and the filter element 40 once the air filter assembly 20 is assembled.

Baffle Attachment to the Filter Element

Figure 6:
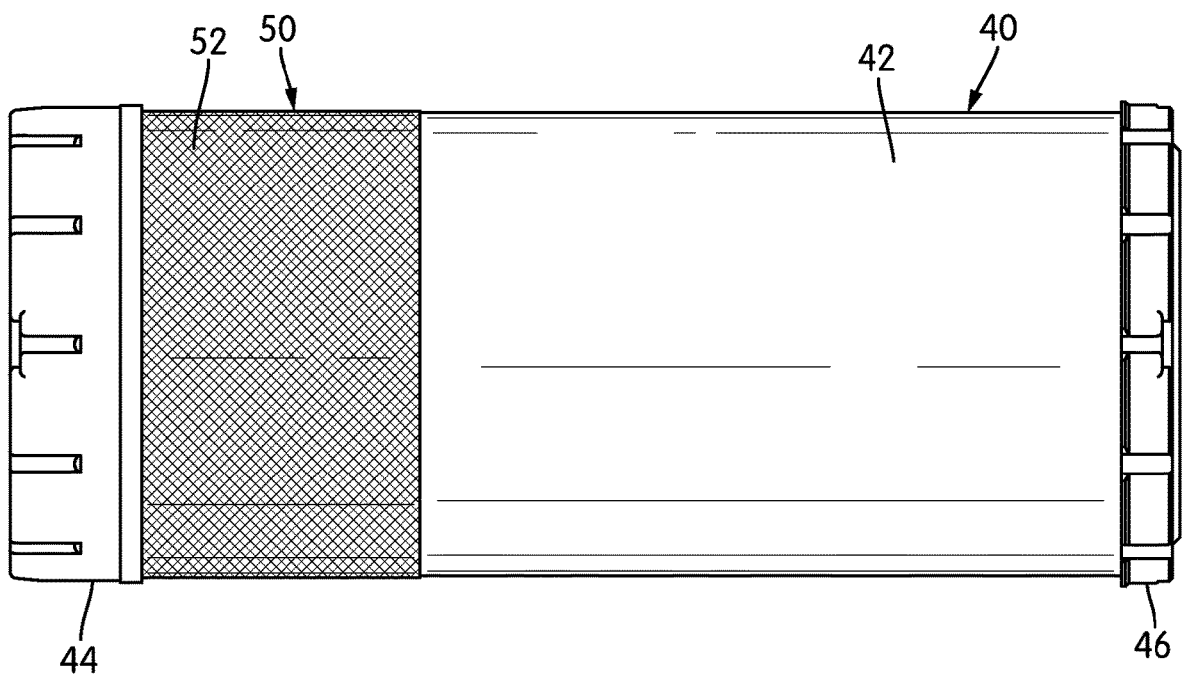
FIG. 6 is a side view of a filter element and a permeable baffle according to still another embodiment.

According to another embodiment as shown in FIG. 6, the permeable baffle 50 may be attached directly to and be a part of the filter element 40 and may not include the frame 62. For example, the permeable baffle 50 may be directly connected and attached to a variety of different portions of the filter element 40. For example, the permeable baffle 50 may be directly or indirectly connected and attached to the first endcap 44, the second endcap 46, and/or to the filter media 42 of the filter element 40 in order to shield at least a portion of the outer surface (e.g., the dirty side) of the filter media 42 from incoming unfiltered air flow from the inlet 32. The permeable baffle 50 may extend along only a portion of the filter media 42 of the filter element 40, or along the entire length of the filter media 42 of the filter element 40 (or along the entire filter element 40). Furthermore, the permeable baffle 50 may circumferentially cover only a portion of the circumference of the filter media 42 or the entire circumference of the filter media 42. According to one embodiment, the permeable baffle 50 may only cover the area of the filter media 42 that is directly downstream of the inlet 32 when the filter element 40 (in particular the filter media 42) is positioned within the housing 30.

The permeable material 52 extends and is positioned along the outer surface (which is the upstream, unfiltered side) of the filter media 42 such that the permeable material 52 is upstream from the filter media 42 within the housing 30. Furthermore, the permeable material 52 is positioned along the filter media 42 such that the permeable material 52 aligns with the inlet 32 of the housing 30 when the filter element 40 is positioned within the housing 30 (and the permeable material 52 is thereby positioned between the inlet 32 and the filter media 42 along the direction of fluid flow through the air filter assembly 20). Accordingly, as the fluid flows through the air filter assembly 20, the fluid flows into the inlet 32 of the housing 20, reaches the permeable material 52 (before the filter media 42), is partially blocked by (and partially flows through) the permeable material 52, and subsequently flows through the filter media 42 (by flowing into the outer surface of the filter media 42 and out through the inner surface of the filter media 42), into the inner area defined by the filter media 42, through the first endcap 44, and out through the outlet 34 of the housing 30.

By attaching the permeable material 52 directly to a portion of the filter element 40 without any additional support frame, the permeable baffle 50 takes up less radial space around the outside of the filter element 40 (compared to if a support frame were used with the permeable material 52) since support frames are typically thicker than the permeable material 52 (by, for example, approximately 0.5 millimeters (mm)). Furthermore, compared to air filter assemblies with molded rib baffles or plastic frames, attaching the permeable material 52 directly to a portion of the filter element 40 reduces the need for complex injection molding, which reduces the cost of the air filter assembly 20.

According to one embodiment, the permeable baffle 50 (in particular the permeable material 52) is a permanent part of or permanently fixed to at least a portion of the filter element 40, such as the filter media 42, the first endcap 44, and/or the second endcap 46 (e.g., permanently attached to or constructed with the filter element 40 as a single piece or unitary component that cannot be separated without destruction). According to another embodiment, the permeable baffle 50 (in particular the permeable material 52) is removably attachable to the filter element 40 (e.g., to the filter media 42, the first endcap 44, and/or the second endcap 46) as a separate component.

According to one embodiment, the permeable baffle 50 may be potted in the urethane along with the filter media 42, and thereby indirectly attached to the filter media 42 through the urethane. With this arrangement, the permeable baffle 50 may be directly attached to the first endcap 44 and/or the second endcap 46. Alternatively or additionally, an adhesive (such as a hotmelt adhesive) may be used to attach the permeable baffle 50 to a portion (such as the filter media 42) of the filter element 40.

Types of Permeable Material

Figure 7:
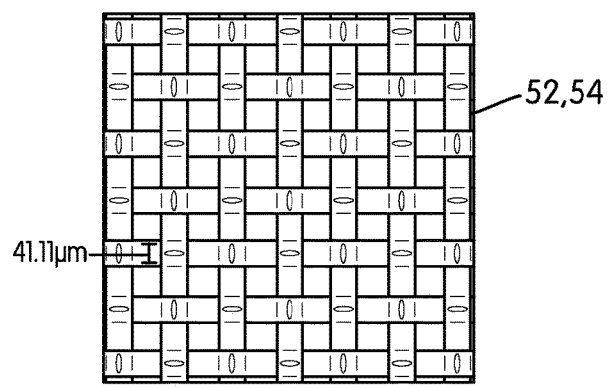
FIG. 7 is a microscopic view of a woven mesh material of the permeable baffle according to one embodiment.
Figure 8:
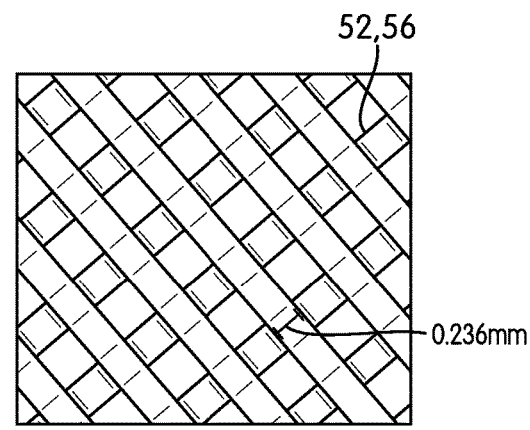
FIG. 8 is a microscopic view of an extruded mesh material of the permeable baffle according to another embodiment.
Figure 9:
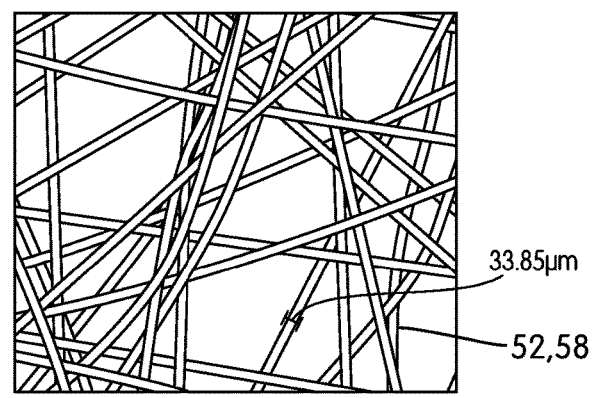
FIG. 9 is a microscopic view of a non-woven mesh material of the permeable baffle according to still another embodiment.

As shown in FIGS. 7-9, the permeable material 52 may be a variety of different materials. According to one embodiment as shown in FIG. 7, the permeable material 52 is a permeable woven mesh 54 in which a first group of fibers and second group of fibers are woven together and overlap each other along both sides. The fibers within each group are approximately parallel to each other, and the first and second groups of fibers are oriented approximately perpendicular to each other. The diameter of the fibers may be approximately 10 to 500 micrometers (μm), depending on the desired size of the openings between the fibers and the amount of open area. According to one embodiment, the diameter of the fibers is approximately 41 μm.

According to another embodiment as shown in FIG. 8, the permeable material 52 is a permeable extruded mesh 56 in which a first group of fibers that are oriented in one direction is loaded upon and positioned completely on one side of a second group of fibers that is oriented in a different direction. The fibers within each group are approximately parallel to each other, and the first and second groups of fibers are oriented approximately perpendicular to each other. The first and second groups of fibers are bonded to each other at their contact points, but are not woven together. In one particular embodiment, the mean diameter of the fibers may be approximately 236 μm.

The woven mesh 54 and the extruded mesh 56 will each provide less restriction than an equivalently-sized impermeable baffle 150. However, for the most effective precleaning if the woven mesh 54 or the extruded mesh 56 only covers a portion of the filter media 42 (i.e., a partial baffle), the woven mesh 54 or the extruded mesh 56 has openings that are less than approximately 400 μm (where the openings refer to the area between the fibers of the woven mesh 54 or the extruded mesh 56). For the most effective precleaning if the woven mesh 54 or the extruded mesh 56 fully encloses the filter media 42 (i.e., fully wrapping around the entire length and circumference of the filter media 42), the woven mesh 54 or the extruded mesh 56 has openings with an average size between approximately 20 and 400 μm while having more than approximately 20% open area to limit the additional restriction caused by the permeable baffle 50. The lower size limit of the openings ensures that a dust cake does not accumulate on the woven mesh 54 or the extruded mesh 56 by collecting relatively small particles that cannot be captured through precleaning. Otherwise, dust cakes that are accumulated on woven mesh may rapidly increase the pressure drop, causing the air filter assembly 20 to reach its terminal restriction prematurely.

According to yet another embodiment as shown in FIG. 9, the permeable material 52 is a permeable non-woven filtration media or material 58 in which the fibers are generally randomly oriented and laid on each other, which creates a wide distribution of opening sizes. Similar to the woven mesh 54 and the extruded mesh 56, the closed portions of the non-woven material 58 ensures that all of the solid particles do not penetrate the non-woven material 58, while the open portions allow some air to flow through the non-woven material 58.

For the most effective precleaning if the non-woven material 58 only covers a portion of the filter media 42 (i.e., a partial baffle) and if the non-woven material 58 fully encloses the filter media 42 (i.e., fully wrapping around the entire length and circumference of the filter media 42), the average diameter of the fibers of the non-woven material 58 is less than approximately 400 μm and the base or basis weight of the fibers is greater than approximately 0.2 ounces per yard ($oz/yd^2$) and preferably between 0.2 and 2 $oz/yd^2$. For example, the diameter of the fibers may be approximately 33 μm. Additionally, if the non-woven material 58 fully encloses the filter media 42, the non-woven material 58 has a Frazier permeability greater than approximately 100 feet per minute (ft/min) velocity at 0.5 in$H_2$O (and preferably between 100 and 2,000 ft/min) to limit the additional restriction caused by the permeable baffle 50.

As utilized herein, the terms "approximately," "substantially," and similar terms are intended to have a broad meaning in harmony with the common and accepted usage by those of ordinary skill in the art to which the subject matter of this disclosure pertains. The term "approximately" as used herein refers to ±5% of the referenced measurement, position, or dimension. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," "attached," and the like as used herein mean the joining of two members directly to one another. Such joining may be stationary (e.g., permanent) or moveable (e.g., removable or releasable).

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An air filter assembly comprising:
   a housing comprising an outer wall with a substantially cylindrical inner surface, an inlet, and an outlet, the inlet positioned along and extending through the outer wall, the outlet positioned along and extending through an axial end of the housing;
   a filter element comprising a filter media with a substantially cylindrical outer surface, the filter element positionable within the housing; and
   a permeable baffle positioned between the inlet and the filter element, the permeable baffle allowing at least some air to flow therethrough, the permeable baffle comprising a permeable material defining openings with an average size between 20 and 400 µm.

2. The air filter assembly of claim 1, wherein the permeable baffle covers the entire outer surface of the filter media.

3. The air filter assembly of claim 1, wherein the permeable baffle covers only a portion of the outer surface of the filter media.

4. The air filter assembly of claim 1, wherein the permeable baffle is permanently fixed to one of the housing or the filter element.

5. The air filter assembly of claim 1, wherein the permeable baffle is removably attachable to the housing or the filter element.

6. The air filter assembly of claim 1, further comprising a cover removably attachable to the housing, the permeable baffle permanently fixed to the cover.

7. The air filter assembly of claim 1, further comprising a cover removably attachable to the housing, the permeable baffle removably attachable to the cover.

8. The air filter assembly of claim 1, wherein the permeable baffle includes a support frame, the permeable material being attached to or integrated with the support frame.

9. An air filter assembly comprising:
   a housing comprising an outer wall, an inlet, and an outlet, the housing containing a filter element, the outer wall comprising a substantially cylindrical inner surface that incoming air flow from the inlet flows substantially tangential to, the outlet positioned along and extending through an axial end of the housing; and
   a permeable baffle positioned within the housing between the inlet and the filter element and shielding at least a portion of the filter element from the incoming air flow through the inlet, the permeable baffle comprising a permeable material defining openings with an average size between 20 and 400 µm.

10. The air filter assembly of claim 9, further comprising the filter element, the filter element comprising a closed axial end, an open axial end, and a filter media extending axially between the closed axial end and the open axial end, wherein the open axial end of the filter element is fluidly connected to and sealed with the outlet of the housing.

11. The air filter assembly of claim 9, wherein the inlet is offset from a centerline of the housing such that the inlet is closer to one axial end of the housing than the other axial end.

12. The air filter assembly of claim 9, wherein the permeable baffle is substantially cylindrical.

13. The air filter assembly of claim 9, wherein the permeable material is a woven mesh.

14. The air filter assembly of claim 9, wherein the permeable material is an extruded mesh.

15. The air filter assembly of claim 9, wherein the permeable material is a non-woven filtration media with a basis weight of the fibers between 0.2 to 2 oz/yd$^2$ and a Frazier permeability between 100 and 2,000 ft/min.

16. The air filter assembly of claim 9, wherein the permeable baffle is permanently fixed to the housing.

17. The air filter assembly of claim 9, wherein the permeable baffle is removably attachable to the housing.

18. An air filter assembly comprising:
   a housing comprising an outer wall, an inlet, and an outlet, the housing containing a filter element, the outer wall comprising a substantially cylindrical inner surface that incoming air flow from the inlet flows substantially tangential to,
   the housing comprising a first axial end and a second axial end, the outlet positioned along and extending through the axial end of the housing, the second axial end of the housing substantially open;
   a cover attachable to the second axial end of the housing such that the cover covers the second axial end; and
   a permeable baffle positioned within the cover in order to be positioned between the inlet and the filter element and to shield at least a portion of the filter element from the incoming air flow through the inlet, the permeable baffle comprising a permeable material defining openings with an average size between 20 and 400 µm.

19. The air filter assembly of claim 18 further comprising the filter element, the filter element comprising a closed axial end, an open axial end, and a filter media extending axially between the closed axial end and the open axial end, wherein the open axial end of the filter element is fluidly connected to and sealed with the outlet of the housing.

20. The air filter assembly of claim 18, wherein the inlet is offset from a centerline of the housing such that the inlet is closer to one axial end of the housing than the other axial end.

21. The air filter assembly of claim 18, wherein the permeable material is a woven mesh.

22. The air filter assembly of claim 18, wherein the permeable material is an extruded mesh.

23. The air filter assembly of claim 18, wherein the permeable material is a non-woven filtration media with a basis weight of the fibers between 0.2 to 2 oz/yd$^2$ and a Frazier permeability between 100 and 2,000 ft/min.

24. The air filter assembly of claim 18, wherein the permeable baffle is permanently fixed to the filter media.

25. The air filter assembly of claim 18, wherein the permeable baffle is removably attachable to the filter media.

26. An air filter element comprising:
   a filter media for filtering air; and
   a permeable baffle attachable to the filter media and shielding at least a portion of the filter media, the permeable baffle comprising a permeable material defining openings with an average size between 20 and 400 µm, the permeable baffle covering only a portion of an outer surface of the filter media.

27. The air filter element of claim 26, wherein the permeable material is a woven mesh.

28. The air filter element of claim 26, wherein the permeable material is an extruded mesh.

29. The air filter element of claim 26, wherein the permeable material is a non-woven filtration media with a basis weight of the fibers between 0.2 to 2 oz/yd$^2$ and a Frazier permeability between 100 and 2,000 ft/min.

30. The air filter element of claim 26, wherein the filter media is substantially cylindrical and the permeable baffle extends around at least a portion of a curved outer surface of the filter media.

31. The air filter element of claim 26, wherein the permeable baffle is directly attachable to the filter media.

32. The air filter element of claim 26, further comprising an endcap attached to one end of the filter media, wherein the permeable baffle is directly attachable to the endcap.

33. The air filter element of claim 26, wherein the permeable baffle allows at least some air to flow therethrough.

34. The air filter element of claim 26, wherein the permeable baffle is permanently fixed to the filter media.

35. The air filter element of claim 26, wherein the permeable baffle includes a support frame, the permeable material being attached to or integrated with the support frame.

36. An air filter element comprising:
a filter media for filtering air; and
a permeable baffle attachable to the filter media and shielding at least a portion of the filter media, the permeable baffle comprising a permeable material defining openings with an average size between 20 and 400 μm, wherein the permeable baffle is removably attachable to the filter media.

* * * * *